Aug. 1, 1944.  W. K. KEARSLEY  2,354,918
TEMPERATURE CONTROL SYSTEM FOR ELECTRIC HEATING DEVICES
Filed Aug. 26, 1942
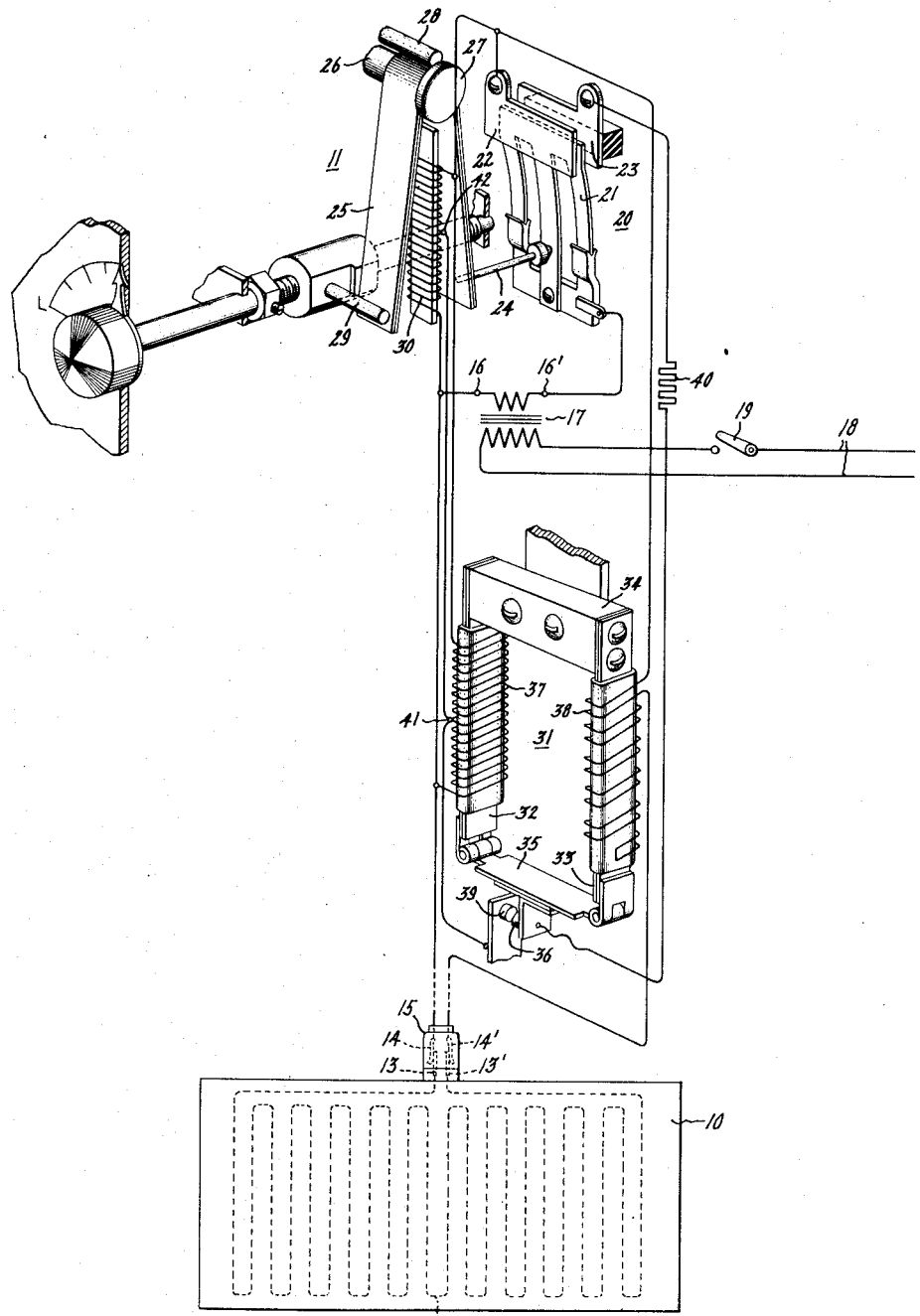
Inventor:
William K. Kearsley,
by Harry E. Dunham
His Attorney.

Patented Aug. 1, 1944

2,354,918

UNITED STATES PATENT OFFICE 2,354,918

TEMPERATURE CONTROL SYSTEM FOR ELECTRIC HEATING DEVICES

William K. Kearsley, Schenectady, N. Y., assignor to General Electric Company, a corporation of New York Application August 26, 1942, Serial No. 456,190

8 Claims. (Cl. 219—46)

My invention relates to temperature control systems for electric heating devices such as electric blankets, electric heating pads, and the like.

Heretofore, in order to protect an electric heating device, such as an electric blanket, against overheating in case it is folded or rolled while in use, in such a manner as to produce an abnormally high temperature therein under normal operating voltage conditions it has been common practice to locate within the blanket a number of thermostats which are so connected in the heating circuit of the blanket as to interrupt this circuit in response to predetermined abnormally high blanket temperatures.

One object of my present invention is to provide an improved arrangement of apparatus for protecting an electric heating device, such as an electric blanket or the like, which does not require the use of such thermostats or any other auxiliary devices within the device itself and which is not affected by blanket temperature changes produced by changes in the voltage of the source supplying current to the device.

In accordance with my invention, I provide an arrangement of apparatus which depends for its operation upon the change in the resistance in the heating circuit of the device produced by abnormally high temperatures of the device under normal voltage conditions of the supply circuit and which is not affected by changes in the resistance of the heating circuit produced by abnormally high temperatures resulting from abnormal changes in the voltage of the supply circuit.

My invention will be better understood from the following description when taken in connection with the accompanying drawing, the single figure of which diagrammatically illustrates an electric blanket temperature control system embodying my invention and with certain of the apparatus shown in perspective, and the scope of my invention will be pointed out in the appended claims.

Referring to the drawing, 10 represents an electric blanket which is controlled by means of a suitable temperature responsive device 11 that is thermally removed from the blanket and arranged to respond to the ambient temperature of the blanket. The blanket 10 is provided with a heating element 12 which is preferably arranged in a plurality of convolutions so as to be distributed substantially uniformly throughout the area of the blanket. The ends of the heating element 12 are connected to the terminal pins 13 and 13', respectively, which are arranged to be engaged by a pair of contacts 14 and 14' in a supply plug 15 when the plug is applied as shown in the drawing. The contact 14 of the plug 15 is permanently connected to the secondary terminal 16 of a step-down voltage transformer 17, the primary winding of which is arranged to be connected to a suitable supply circuit 18 by means of a manually controlled switch 19. The contact 14' of the supply plug 15 is arranged to be connected to the other secondary terminal 16' of the transformer 17 by means of the temperature responsive device 11. As shown, the temperature responsive device 11 comprises a two-position snap-action switch 20 having a movable contact 21 adapted in one position of the switch to engage a stationary contact 22 and in the other position of the switch to engage a stationary contact 23. The movable contact 21, which is permanently connected electrically to the secondary terminal 16' of the transformer 17, is normally biased into engagement with the stationary contact 22, which is permanently connected electrically to the contact 14' of the supply plug 15 so that when the contacts 21 and 22 of the switch are in engagement, the heating circuit of the electric blanket 10 is completed.

The movable contact 21 of the switch 20 is arranged to be moved out of engagement with stationary contact 22 and into engagement with stationary contact 23 by means of a plunger pin 24, which in turn is controlled by means of a bimetallic element 25. As shown, the bimetallic element 25 is of hairpin or U shape and is supported by means of a stationary pin 26 over which the bimetallic element is draped. The pin 26 is provided with a head 27 to prevent axial movement of the bimetallic element 25 along pin 26. A second stationary pin 28 is also provided above the pin 26 to prevent vertical movement of the bimetallic element 25 with respect to the pin 26. The bimetallic element 25 is so arranged that when its temperature increases above a predetermined value, its two arms spread apart, whereas when its temperature decreases, its two arms move toward each other. One of the arms of the bimetallic element 25 bears against the plunger pin 24 while the other arm bears against an adjustable stop 29. Therefore, when the temperature of the bimetallic element 25 exceeds a predetermined value, it moves the plunger 24 sufficiently to cause the movable contact 21 to be snapped out of engagement with contact 22 and into engagement with contact 23, and when the temperature of the bimetallic element 25 decreases below a predetermined value, the two arms of the bimetallic element move toward each other sufficiently to cause the movable contact 21 to be snapped out of engagement with contact 23 and into engagement with contact 22. The setting of the thermostatic device 11 is arranged to be manually adjusted by manually adjusting the position of the stop 29 in any suitabale manner.

In addition to the ambient temperature in which the bimetallic element 25 is located, it is also subject to a local heating source comprising a heating element 30 which is arranged to be connected across the secondary terminals 16 and 16' of the transformer 17 when the contacts 21 and 22 of the switch 20 are in engagement.

With the arrangement heretofore described, it will be evident to those skilled in the art that under normal operating conditions the bimetallic element 25 operates to effect periodic engagement and disengagement of the contacts 21 and 22 in accordance with the ambient temperature to maintain a predetermined thermal condition of the blanket 10.

In order to protect the blanket 10 against abnormally high temperatures in case it becomes folded or rolled while in use, I provide in accordance with my invention a thermally controlled device 31, which is so constructed and connected as to distinguish between an abnormally high blanket temperature due merely to an increase in the supply circuit voltage and a similar abnormally high blanket temperature produced by an abnormal operating condition of the blanket while in use. This control device 31 depends for its operation upon the increase in the resistance of the heating circuit of the blanket resulting from abnormally high temperatures of the blanket produced by other abnormal operating conditions than abnormally high voltage conditions of the supply circuit.

In the preferred embodiment of the thermally controlled device 31 shown in the drawing, I accomplish the desired results by providing two identical bimetallic strips 32 and 33 having two of their corresponding expansion metals adjacent to each other and with one end of each strip fastened to a stationary block 34 while the free ends of these strips are hinged to a bar 35 carrying a contact 36. With such a construction, it will be apparent that changes in ambient temperature do not change the position of the bar 35 and the contact 36 since the forces exerted by the bimetallic strips 32 and 33 due to changes in ambient temperature are equal and opposite and, therefore, neutralize each other. Heating elements 37 and 38 are respectively provided for the bimetallic elements 32 and 33. The heating element 37 comprises a relatively large number of turns of fine resistance wire connected between the secondary terminal 16 of the transformer 17 and the stationary contact 22 of the thermally operated switch 20 so that the heating element 37 is connected across the secondary terminals 16 and 16' of the transformer 17 when the contacts 21 and 22 of the switch 20 are in engagement. The heating element 38 comprises a relatively small number of turns of larger resistance wire connected in series between the contacts 14' of the plug 15 and the contact 22 of the thermally operated switch 20 so that the heating element 38 is connected in series with the heating element 12 of the electric blanket 10. Preferably, the heating element 38 is noninductively wound so as to decrease the impedance of the heating element to a minimum.

The heating element 37 is designed so that its temperature coefficient of resistivity is substantially equal to the temperature coefficient of resistivity of the series circuit containing the heating element 38 of the thermally operated control device 31 and the heating element 12 of the blanket 10 under normal operating conditions of the blanket. Also, the current-resistance drops across the two heating elements 37 and 38 are made substantially the same under normal operating conditions of the blanket 10 so that both of these heating elements produce substantially the same amount of heat. Therefore, changes in the voltage of the supply circuit 18 produce no movement of the bar 35 and the contact 36. When, however, an abnormally high blanket temperature occurs due to the blanket being folded or rolled while in use or some other abnormal operating condition occurs which does not produce a similar effect on the current through the heating element 37, the increase in resistance of the heating element 12 of the blanket 10 due to the abnormally high blanket temperature effects a reduction in the current through the heating element 38 without a similar reduction in current being produced through the heating element 37. Consequently, the balance of the opposing forces exerted by the bimetallic strips 32 and 33 is upset and the bar 35 is moved so as to cause the movable contact 36 to engage the stationary contact 39. The contact 36 is connected to the contact 23 of the switch 20 through a current limiting resistor 40, and the contact 39 is connected to the intermediate taps 41 and 42, respectively, on the heating elements 37 and 38. Consequently, when the contacts 36 and 39 are in engagement and the thermally operated switch 20 is in its open position in which the heating element 12 of the electric blanket is disconnected from the supply circuit 18, heating circuits are completed for portions of the heating elements 38 and 37 across the secondary terminals 16 and 16' of the transformer 17 so that the heating element 38 produces sufficient heat to maintain the switch 20 in its open position and the heating element 37 produces sufficient heat to maintain the control device 31 in its operated position under normal operating voltage conditions of the supply circuit 18. Therefore, the normal heating circuit for the heating element 12 through the contacts 21 and 22 of the switch 20 is permanently opened so as to reduce the current supplied to the heating element 12 to zero and thereby cause the temperature of the blanket to be reduced.

Normal operating conditions of the temperature control system may be restored after the cause of the abnormal blanket temperature has been removed by merely opening the switch 19 in the primary circuit of the transformer 17 and maintaining it open for a sufficient length of time to allow the thermally operated devices 20 and 31 and the blanket 12 to be restored to their normal operating conditions.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an electric heating device having a heating circuit the impedance of which varies with the temperature of the device, a source of current, a thermal responsive device having one position in which it connects said source to said heating circuit and another position in which said connection is interrupted, a heating element for said thermal responsive device connected to said source, a second thermal responsive device having two similar opposed thermostatic elements, a heating element for one of said thermostatic elements connected across said source in parallel with said heating circuit, a heating element for the other of said thermostatic elements connected in series with said heating circuit, and means controlled by second thermal responsive device for increasing for a given voltage of said source the heating effect produced by the heating element of said first mentioned thermal responsive device and the first mentioned heating element of said second thermal responsive device.

2. In combination, an electric heating device having a heating circuit the impedance of which varies with the temperature of the device, a source of current, a thermal responsive device having one position in which it connects said source to said heating circuit and another position in which said connection is interrupted, a heating element for said thermal responsive device connected to said source, a second thermal responsive device having two similar opposed thermostatic elements, a heating element for one of said thermostatic elements connected across said source in parallel with said heating circuit, a heating element for the other of said thermostatic elements connected in series with said heating circuit, and means controlled by second thermal responsive device for changing the connections of the heating element of said first mentioned thermal responsive device to increase the heating effect produced thereby under normal operating voltage conditions of said source whereby said first mentioned thermal responsive device remains permanently in said position in which said connection to said heating circuit is interrupted.

3. In combination, an electric heating device having a heating circuit the impedance of which varies with the temperature of the device, a source of current, a thermal responsive device having one position in which it connects said source to said heating circuit and another position in which said connection is interrupted, a heating element for said thermal responsive device connected to said source, a second thermal responsive device having two similar opposed thermostatic elements, a heating element for one of said thermostatic elements connected across said source in parallel with said heating circuit, a heating element for the other of said thermostatic elements connected in series with said heating circuit, and means jointly controlled by both of said thermal responsive devices only upon the occurrence of an abnormally high temperature of said heating device while said first mentioned thermal responsive device is in said position in which said connection to said heating circuit is interrupted for increasing for a given voltage of said source the heating effect produced by the heating element of said first mentioned thermal responsive device so that said first mentioned thermal responsive device remains permanently in said position in which said connection to said heating circuit is interrupted.

4. In combination, an electric heating device having a heating circuit the impedance of which varies with the temperature of the device, a source of current, a thermal responsive device having one position in which it connects said source to said heating circuit and another position in which said connection is interrupted, a heating element for said thermal responsive device connected to said source, a second thermal responsive device having two similar opposed thermostatic elements, a heating element for one of said thermostatic elements connected across said source in parallel with said heating circuit, a heating element for the other of said thermostatic elements connected in series with said heating circuit, and means jointly controlled by both of said thermal responsive devices only upon the occurrence of an abnormally high temperature of said heating device while said first mentioned thermal responsive device is in said position in which said connection to said heating circuit is interrupted for increasing for a given voltage of said source the heating effect produced by the heating element of said first mentioned thermal responsive device and the heating effect produced by the first mentioned heating element of said second thermal responsive device.

5. In combination, an electric heating device having a heating circuit the impedance of which varies with the temperature of the device, a source of current, a thermal responsive device having one position in which it connects said source to said heating circuit and another position in which said connection is interrupted, a heating element for said thermal responsive device connected to said source, a second thermal responsive device having two similar opposed thermostatic elements, a heating element for one of said thermostatic elements connected across said source in parallel with said heating circuit, a heating element for the other of said thermostatic elements connected in series with said heating circuit, and means jointly controlled by both of said thermal responsive devices only upon the occurrence of an abnormally high temperature of said heating device while said first mentioned thermal device is in said position in which said connection to said heating circuit is interrupted for changing the connections of the heating element of said first mentioned thermal responsive device and of the first mentioned heating element of said second mentioned thermal responsive device to increase the heating effects produced thereby for a given voltage of said source so that said first mentioned thermal responsive device remains permanently in said position in which said connection to said heating circuit is interrupted.

6. An arrangement for protecting an electrically operated device against abnormally high temperatures comprising two differentially arranged devices, means for causing one of said differentially arranged devices to exert a torque proportional to the current flowing through said electrically operated device, and means for causing the other of said differentially arranged devices to exert a torque proportional to the voltage of the electric source supplying current to said electrically operated device and independently of changes in the impedance of said electrically operated device.

7. An arrangement for protecting an electric heating device against abnormally high temperatures comprising two opposed thermostatic elements, means for heating one of said elements in response to the current in the heating circuit of said device, and means for heating the other of said elements in response to the voltage of the electric source supplying current to said heating device and independently of changes in the impedance of the heating circuit of said device.

8. An arrangement for protecting an electric blanket against abnormally high temperatures due to an abnormal use of the blanket comprising two opposed thermostatic elements, a heating element for one of said thermostatic elements connected in series relation with the heating element of said blanket and a heating element for the other thermostatic element connected in parallel with said first mentioned heating element and the heating element of said blanket.

WILLIAM K. KEARSLEY.